Figures 1, 4:
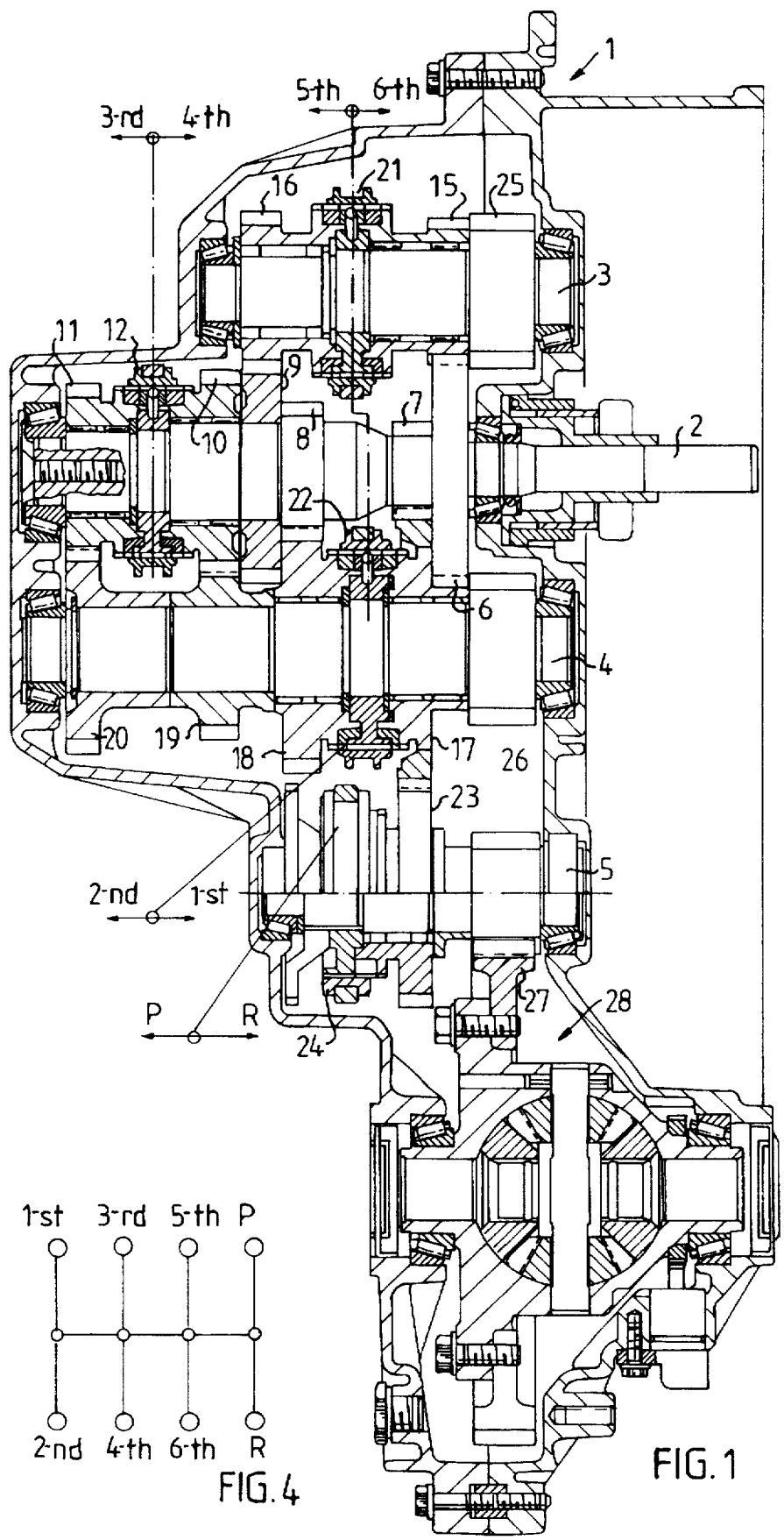

United States Patent
Janiszewski et al.

[11] Patent Number: 5,799,536
[45] Date of Patent: Sep. 1, 1998

[54] MOTOR VEHICLE GEARBOX

[75] Inventors: Grzegorz Janiszewski, Angered; Lars Jansson, Onsala, both of Sweden

[73] Assignee: AB Volvo, Gothenburg, Sweden

[21] Appl. No.: 805,558

[22] Filed: Feb. 25, 1997

[30] Foreign Application Priority Data

Feb. 28, 1996 [SE] Sweden .................. 9600775

[51] Int. Cl.$^6$ ............................ F16H 57/00
[52] U.S. Cl. ....................... 74/331; 192/4 A
[58] Field of Search .................. 74/331; 192/4 A

[56] References Cited

U.S. PATENT DOCUMENTS

| | | |
|---|---|---|
| 4,310,081 | 1/1982 | Kolacz . |
| 4,493,403 | 1/1985 | Takano et al. . |
| 4,614,256 | 9/1986 | Kuwayama et al. . |
| 5,365,804 | 11/1994 | Downs et al. .................. 192/4 A |
| 5,366,053 | 11/1994 | Yant . |
| 5,381,878 | 1/1995 | Ohshima et al. ................ 192/4 A |
| 5,687,611 | 11/1997 | Sin et al. ...................... 192/4 A |

Primary Examiner—Dirk Wright
Attorney, Agent, or Firm—Young & Thompson

[57] ABSTRACT

Motor vehicle gearbox with a parking brake, consisting of a toothed wheel (30) non-rotatably mounted on a reverse gear shaft (5) and a locking arm (33) swingably mounted in the housing (1) of the gearbox and having a detent (33a) which can be inserted into a tooth space (32) in the toothed wheel with the aid of a knob (41) on the selector shaft (38) of the reverse gear fork (37). The reverse gear shaft has a non-rotatable gear (29) meshing with a final drive, so that locking the reverse gear shaft locks the vehicle drive wheels.

9 Claims, 3 Drawing Sheets

MOTOR VEHICLE GEARBOX

The present invention relates to a motor vehicle gearbox, comprising a housing with an input shaft and at least one intermediate shaft, which is disposed to transmit torque to a final drive and has gears meshing with gears on the input shaft, at least one gear in each pair of intermeshing gears on said shafts being releasable on its shaft, a reverse gear shaft with a releasable gear which is arranged, in its engaged position, to transmit reverse torque to the final drive, and locking means acting between the housing and one of said shafts, said means being disposed in one locking position to lock the associated shaft against rotation relative to the housing.

In motor vehicles with transmissions comprising a torque converter, a centrifugal clutch or an electromagnetic clutch, the clutch is disengaged when the engine is stopped, which means that the engine is disengaged from the transmission system and consequently cannot be used as a parking brake, even if one of the gears is engaged. It is generally known in transmissions of this type to arrange a locking device, which when the gear lever or gear selector is moved to a parking position, locks one of the rotating shafts of the transmission.

A transmission known by U.S. Pat. No. 4,493,403 of the type described by way of introduction has an electromagnetic clutch and a four-speed gearbox with a built-in parking brake. In all of the four forward gears and in reverse, the torque is transmitted from an input shaft to an output shaft (the intermediate shaft) with a gear, non-rotatably mounted on the shaft, meshing with the crown gear of a differential. In the reversing gearing, the torque from the input shaft is transmitted via an idle gear freely rotatable on the reversing shaft to the output shaft. A locking wheel in the form of a toothed wheel is non-rotatably mounted on the output shaft. A pawl is pivotably mounted in the gearbox housing and is insertable by means of the gear selector mechanism of the gearbox into a gap in the locking wheel when the gear selector lever is moved to a parking position in order to lock the output shaft relative to the housing. A relatively complicated system of push rods and levers is used to move the pawl into engagement with the toothed wheel when the shift lever is moved to a parking position opposite the reversed position.

The purpose of the present invention is to achieve a gearbox of the type described by way of introduction, which can be made with a more simple system for engaging the parking lock and at the same time achieving a reduction of the forces on the lock mechanism in comparison with the known arrangement described above.

This is achieved according to the invention by virtue of the fact that the releasable gear on the reverse gear shaft is engageable to said shaft and meshes with a gear on the intermediate shaft, and that the locking means act between the housing and the reverse gear shaft.

In the reverse gear in the gearbox according to the invention, the torque is transmitted from the input shaft via the intermediate shaft to the reverse shaft. A gear on the intermediate shaft thus functions as an idler gear transferring torque to a gear locked to the reverse shaft. The advantages of transmitting the reverse gear torque in this manner in combination with a locking device which locks the reverse gear shaft, is, firstly, that the torque from the vehicle drive wheels will be transmitted to the locking device via that gear (the reverse gear) which normally has the greatest mechanical advantage, which results in the least stresses on the components of the locking device, and, secondly, that the engaging mechanism can be designed very simply by being integrated in the engaging and disengaging mechanism for the disengageable reverse gear.

Figure 2:
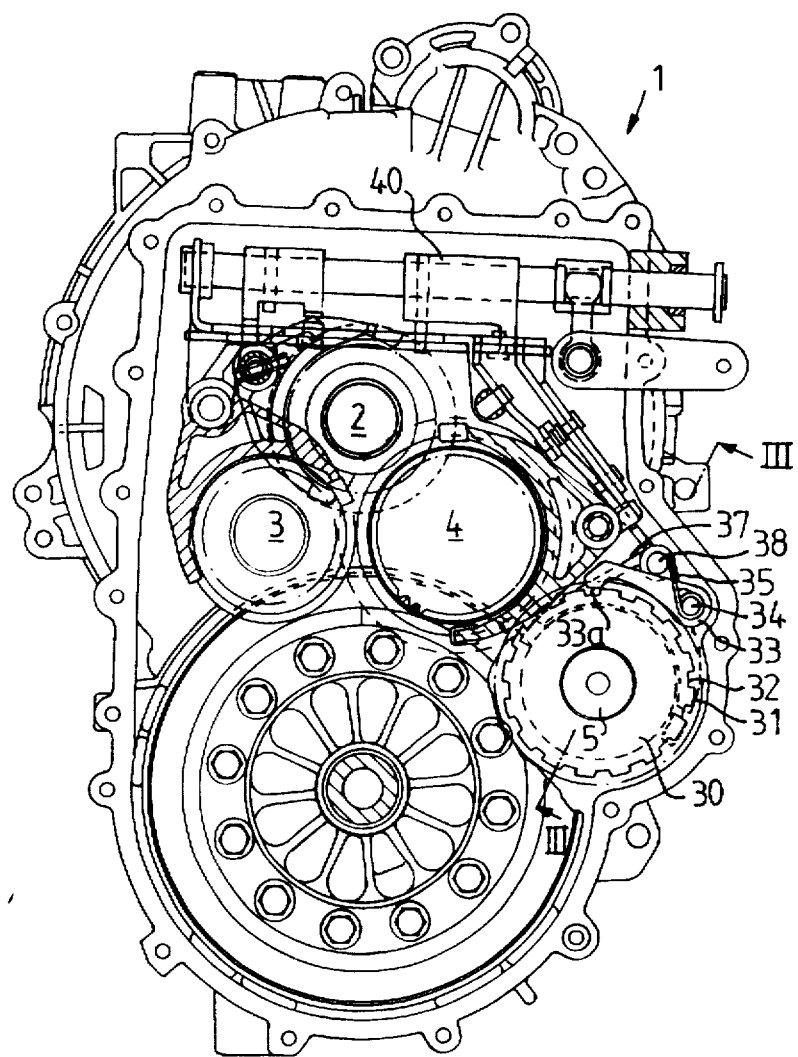
Figure 3:
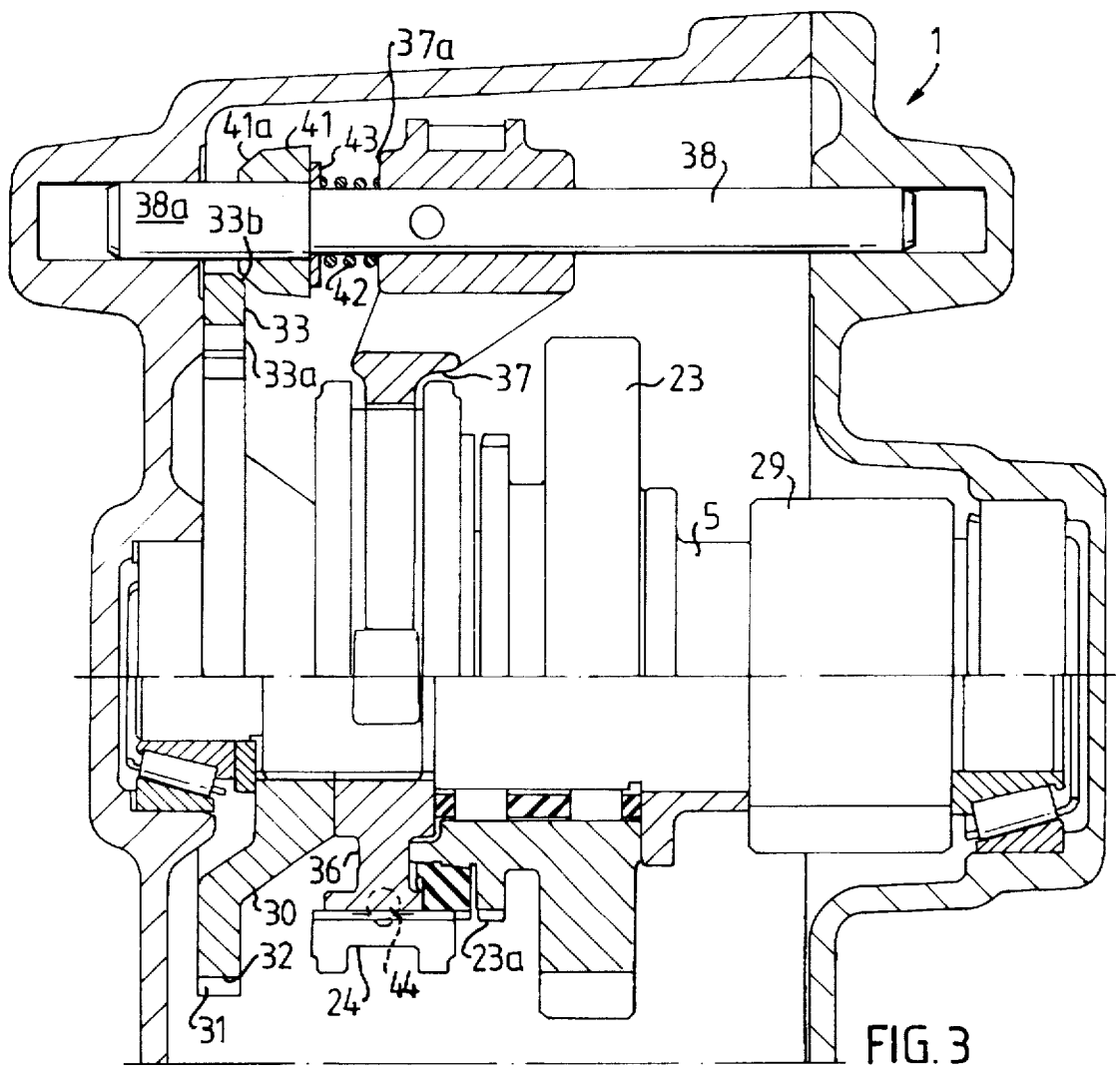

The invention will be described in more detail below with reference to examples shown in the accompanying drawings, where FIG. 1 shows a longitudinal section through one embodiment of a gearbox according to the invention, FIG. 2 shows an end view of the gearbox in FIG. 1, with one end wall removed, FIG. 3 shows a section along the line III—III in FIG. 2, and FIG. 4 is a shift pattern.

In a gearbox housing generally designated 1, which also forms a housing for a clutch (not shown), an input shaft 2, a first and a second intermediate shaft 3 and 4, respectively, and a reverse shaft 5 are rotatably mounted. The input shaft 2 has six gears 6, 7, 8, 9, 10 and 11, of which gears 6, 7, 8 and 9 are non-rotatably fixed while the gears 10 and 11 are freely rotating gears, i.e. they are rotatably mounted on the shaft 2 and can be engaged to their shafts in a conventional manner by means of an engaging mechanism 12 with associated synchromesh devices. The intermediate shafts have gear wheels 15, 16, 17, 18, 19 and 20, of which the gears 15, 16 and 17, 18 are freely rotating gears which can be engaged or fixed to their shafts by means of engaging sleeves 21 and 22, respectively, with associated synchromesh devices. The reverse gear shaft 5 has a freely rotating gear 23 which can be engaged to the shaft by means of an engaging sleeve 24 with associated synchromesh devices.

On the intermediate shafts 3 and 4, there are non-rotatably fixed gears 25 and 26 of equal size, which mesh with the crown gear 27 of a final drive, generally designated 28, in the form of a differential. On the reverse gear shaft 5, a gear 29 is non-rotatably fixed. The gear 29 is of smaller diameter than the gears 25 and 26 and likewise meshes with the crown gear 27 of the final drive 28.

The gear wheels employed in each gear speed are indicated in FIGS. 1 and 2, and only the power transmission in first gear and reverse will be dealt with in more detail here. With the freely rotating gear 17 engaged to the shaft 4 by means of the engaging sleeve 22 and with the other freely rotating gears released, the highest mechanical advantage is obtained for driving forward, i.e. first gear. When shifting from first to reverse, the gear 17 is released and instead the reverse free gear 23 is engaged by means of the engaging sleeve 24 so that the free gear 17 for first gear, which meshes with the reverse free gear 23, will serve as an idler gear to impart a rotational direction to the reverse shaft opposite to the rotational direction of the intermediate shafts 3, 4.

On the reverse shaft 5, a locking wheel 30 is non-rotatably fixed, which has alternating teeth 31 and tooth spaces 32. In one housing end, an arm 33 is pivotably mounted on a pin 34. The arm 33 has a detent portion 33a at its distal end, the shape of which is adapted to the shape of the tooth spaces 32, so that the detent 33a can be inserted into a tooth space 32 and lock the locking wheel 30 when the arm 33 is swung counterclockwise. The arm 33 is biased for disengagement from the locking wheel by a spring 35.

As is most clearly revealed in FIG. 3, the engaging sleeve 24 of the reverse shaft 5 is axially displaceable by means of a fork 37 on a hub portion 36 non-rotatably joined to the shaft 5. The fork 37 is fixed to a selector shaft 38 displaceable in the housing. The movement of a shift lever (not shown) is transmitted to the selector shaft via a gear selector mechanism.

On an end portion 38a of greater diameter of the selector shaft 38, a knob 41 is displaceably mounted. The knob 41 has a bevelled portion facing the arm 33, said portion forming a cam surface 41a, which faces a corresponding bevelled cam surface 33b on the arm 33. A helical spring 42 is disposed between a surface 37a on the fork 37 and a washer 43 displaceably mounted on the selector shaft 38.

In the position shown in FIG. 3, the gear lever is in the neutral position and the engaging sleeve 24 has released the reverse free gear 23. If the shift lever is moved from the neutral position to a parking position P directly opposite the reverse position R (see FIG. 4), the selector shaft 38 is displaced to the left (as shown in FIG. 3), whereupon the cam surface 41a of the knob 41 strikes the cam surface 33b of the arm 33, and due to the incline of the cam surfaces the arm will be forced towards the locking wheel 30. If the detent 33a of the arm should be directly in front of a tooth space 32, the detent 33a will enter the space and directly lock the reverse shaft 5 against rotation. If, however, this is not the case, which is more probable, the swinging of the arm 33 will be prevented by a tooth 31, so that the knob 41 is stopped by the arm 33, while the selector shaft 38 continues its displacement to the left until the gear lever has reached the parking position. During this displacement, the spring 42 is compressed so that the locking arm 33 is under constant spring load towards the locking wheel 30. If there is a small rotation of the shaft 5 caused by a small movement of the vehicle, resulting in a tooth space 32 being displaced to a position under the detent 33a, the detent will snap into the space and lock the shaft 5 against further rotation.

The engaging sleeve 24 has three distinct positions, which are determined by spring-biased balls 44 acting between the sleeve 24 and its hub 36. In one engaging position to the right, the engaging sleeve 24 engages the engaging teeth 23a of the gear 23 and engages the gear to the shaft 5. In a locking position to the left, the selector shaft 38 is kept in the position in which the arm 33 is forced towards the locking wheel 30 by the knob 41. In an intermediate neutral position (FIG. 3), the arm 33 and the reverse gear 23 are released.

The gearbox according to the invention has been described above without reference to any special type of clutch. Even though the need to have a parking brake is greatest in gearboxes which are coupled to the engine via clutches of the type which are released when the engine is shut off, a gearbox according to the invention can, of course, also be used with advantage together with conventional clutches operating manually via a clutch pedal.

We claim:

1. Motor vehicle gearbox, comprising a housing (1) with an input shaft (2) and at least one intermediate shaft (4), which is disposed to transmit torque to a final drive and has gears (17–20) meshing with gears (7, 8, 10, 11) on the input shaft, at least one gear in each pair of intermeshing gears on said shafts being releasable on its shaft, a reverse gear shaft (5) with a releasable gear (23) which is disposed in its engaged position to transmit reverse torque to the final drive (28), and locking means (30, 33) acting between the housing and one of said shafts, said means being disposed in one locking position to lock the associated shaft against rotation relative to the housing, characterized in that the releasable gear (23) on the reverse gear shaft (5) is engageable to the shaft and meshes with a gear (17) on the intermediate shaft (4) and that the locking means (30, 33) act between the housing (1) and the reverse gear shaft (5).

2. Gearbox according to claim 1, characterized in that the reverse gear shaft (5) carries a locking wheel (30) non-rotatably joined to the shaft, and that a locking body (33) is movably mounted in the housing (1) to engage, in a locking position, in a cavity (32) in the locking wheel and lock said wheel relative to the housing.

3. Gearbox according to claim 1, characterized in that the releasable gear (23) on the reverse shaft (5) can be engaged and disengaged by means of an engaging sleeve (24), which is axially displaceable by means of a selector fork (37) on a selector shaft (38) displaceable in the housing, said selector shaft (38) carrying operating means (41), which are arranged, after a certain displacement of the selector shaft in the release direction of the engaging sleeve, to load the locking means (33) towards the locking position.

4. Gearbox according to claim 2, characterized in that the locking wheel (30) is a toothed wheel with a number of evenly distributed teeth (31) and tooth spaces (32), that the locking body is an arm (33) swingably mounted in the housing and having a detent (33a), and that the operating means (41) have a cam surface (41a), which when forced against a cam surface (33b) on the arm (33) exerts a force on the arm for swinging the arm against the toothed wheel (30).

5. Gearbox according to claim 3, characterized in that the operating means (41) are displaceable relative to the selector shaft (38) against the effect of spring means (42) to permit continued displacement of the selector shaft in the release direction of the engaging sleeve (24) after contact between the cam surfaces (33b, 41a), if the detent (33a), due to the position of the toothed wheel (30), is prevented from swinging into a tooth space (32).

6. Gearbox according to one of claim 1, characterized in that the locking means (33) are biased by spring means (35) towards a released position.

7. Gearbox according to one of claim 1, characterized in that the reverse gear shaft (5) has a gear (29) non-rotatably joined to the same, which meshes with the crown wheel (27) of a differential (28).

8. Gearbox according to one of claim 1, characterized in that two intermediate shafts (3, 4) are arranged, each having an individual gear (25, 26) solidly joined to the respective shaft, each meshing with the crown wheel (27) of a differential (28).

9. Gearbox according to one of claim 1, characterized in that the releasable gear (23) on the reverse gear shaft (5) meshes with a releasable intermediate shaft gear (17) which transmits torque in first gear.

\* \* \* \* \*